(12) United States Patent
Cotte

(10) Patent No.: US 12,450,550 B2
(45) Date of Patent: Oct. 21, 2025

(54) SYSTEM FOR DELIVERING AN OBJECT USING A PRIMARY PARCEL IDENTIFYING THE OBJECT AND DISPLAYING OF A LABEL CORRESPONDING TO THE IDENTIFIED OBJECT ON THE PRIMARY PARCEL

(71) Applicant: PA.COTTE SA, Pully (CH)

(72) Inventor: Pierre-Alain Cotte, Amberg (DE)

(73) Assignee: PA.COTTE SA, Pully (CH)

( * ) Notice: Subject to any disclaimer, the term of this patent is extended or adjusted under 35 U.S.C. 154(b) by 0 days.

(21) Appl. No.: 17/912,133

(22) PCT Filed: Mar. 16, 2021

(86) PCT No.: PCT/EP2021/056599
§ 371 (c)(1),
(2) Date: Sep. 16, 2022

(87) PCT Pub. No.: WO2021/185792
PCT Pub. Date: Sep. 23, 2021

(65) Prior Publication Data
US 2023/0162130 A1    May 25, 2023

(30) Foreign Application Priority Data
Mar. 18, 2020   (FR) ...................... 2002657

(51) Int. Cl.
*G06Q 10/0833* (2023.01)
*G06K 19/077* (2006.01)

(52) U.S. Cl.
CPC ... *G06Q 10/0833* (2013.01); *G06K 19/07758* (2013.01)

(58) Field of Classification Search
CPC .............. G06Q 10/0833; G06K 19/07758
See application file for complete search history.

(56) References Cited

U.S. PATENT DOCUMENTS

| 10,657,486 B1* | 5/2020 | Wolter | ............... G06Q 10/0833 |
| 2012/0235791 A1* | 9/2012 | Donlan | ............... G06Q 10/0833 |
| | | | 340/10.1 |

(Continued)

FOREIGN PATENT DOCUMENTS

| FR | 3056796 | 3/2018 |
| JP | 2011170714 | 9/2011 |
| JP | 2018513076 | 5/2018 |

OTHER PUBLICATIONS

Alejandra S. Martinez-Sala, Tracking of Returnable Packaging and Transport Units with active RFID in the grocery supply chain, 2009, p. 161-163 (Year: 2009).*

(Continued)

*Primary Examiner* — Ibrahim N El-Bathy
(74) *Attorney, Agent, or Firm* — Faegre Drinker Biddle & Reath LLP

(57) ABSTRACT

A system for routing an object implements
a plurality of primary packages each having an electronic display device accessible from the exterior of the package, and including a computing unit parameterized to transmit display instructions to the electronic display device,
a computing platform comprising a database relating to the objects, matching, for each object, an identifier and a label to be displayed on the electronic display device, the computing platform being connected to first long-distance communication means, the primary packages being connected to second long-distance communication means,
at least one RFID ticket to be coupled, directly or indirectly, to the object and containing the identifier of the object, and (Continued)

a proximity transceiver integrated into each primary package, able to communicate with the RFID ticket and being parameterized to read the identifier.

7 Claims, 1 Drawing Sheet

(56) References Cited

U.S. PATENT DOCUMENTS

2016/0321604 A1* 11/2016 Imaeda .............. G06Q 10/1093
2021/0150457 A1*  5/2021 Key ................... G06Q 10/083

OTHER PUBLICATIONS

English translation of the Written Opinion as issued by the International Searching Authority, dated Apr. 12, 2021, for International Patent Application No. PCT/EP2021/056599; 9 pages.

International Search Report and Written Opinion as issued by the International Searching Authority, dated Apr. 12, 2021, for International Patent Application No. PCT/EP2021/056599; 16 pages.

\* cited by examiner

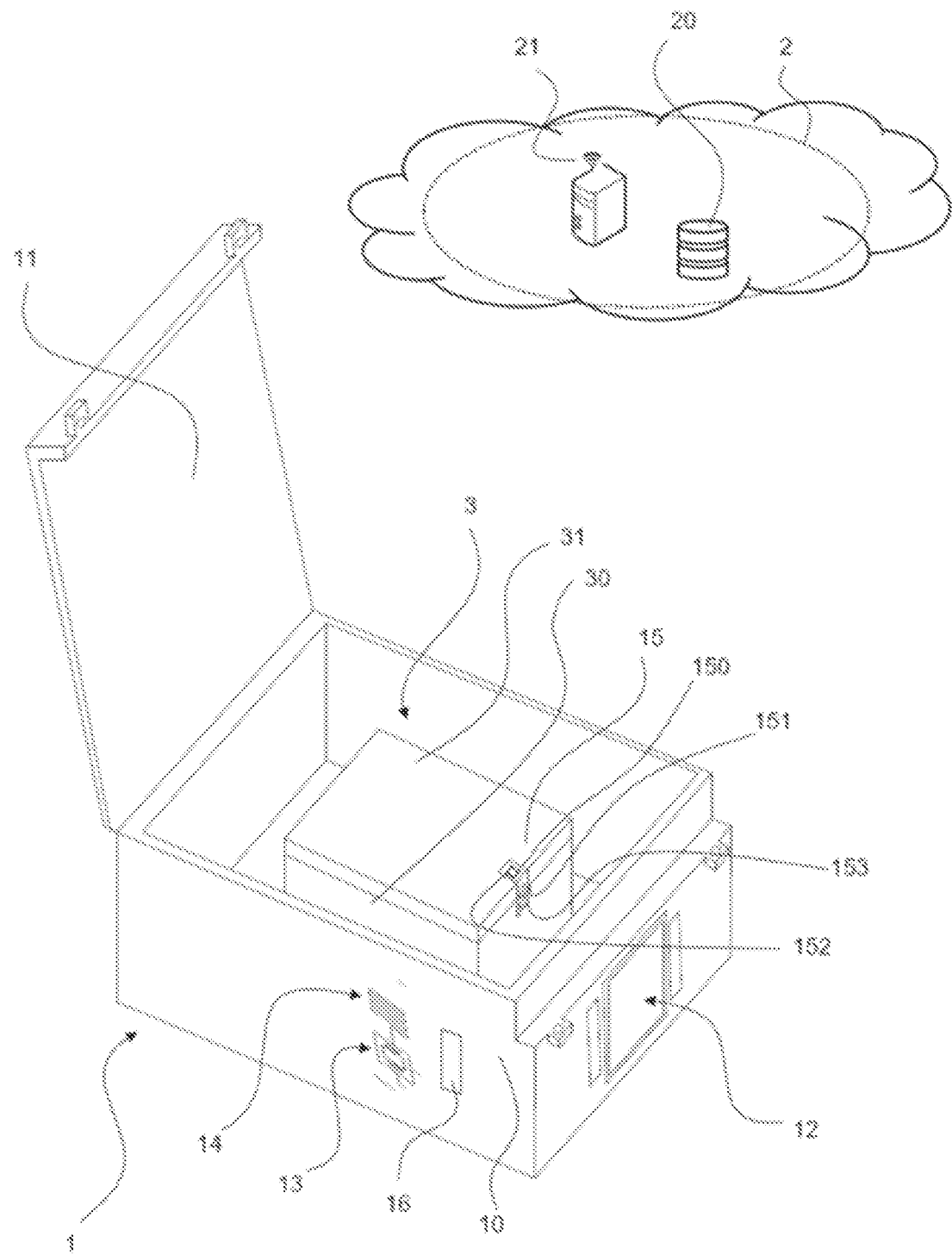

SYSTEM FOR DELIVERING AN OBJECT USING A PRIMARY PARCEL IDENTIFYING THE OBJECT AND DISPLAYING OF A LABEL CORRESPONDING TO THE IDENTIFIED OBJECT ON THE PRIMARY PARCEL

CROSS-REFERENCE TO RELATED APPLICATIONS

The present application is a national stage entry of International (PCT) Patent Application Number PCT/EP2021/056599, filed Mar. 16, 2021, which claims priority to French Patent Application Number 2002657, filed Mar. 18, 2020, the complete disclosures of which are expressly incorporated herein by reference.

The field of the invention is that of the design and manufacture of equipment dedicated to logistics.

More specifically, the invention relates to the routing of objects, and particularly the routing of objects generally from e-commerce platforms or transferred from one individual to another.

In the field of the invention, the routing of objects by e-commerce platforms very often takes place by arranging the object(s) to be routed in a package provided, for the purposes of routing, with a ticket having at least one visual code, in particular taking the form of a printed barcode, which allows identifying the package by each of the actors involved in the routing of the package.

Conventionally, for the routing of one or several object(s), the package is shaped by an operator. The object(s) is/are then disposed in the shaped package, then the latter is closed and ticketed for routing.

In the field of the routing of objects, there is a theme that concerns the reshipment of products, or more broadly of objects, with a view to their recycling and/or their destruction.

In this regard, mention can be made in particular to:
used coffee capsules;
used batteries or, more generally, batteries for small electrical equipment; some medical equipment, such as syringes;
expired medicines;
. . . .

Currently, for some of these objects that must or can be reshipped, it is observed, and even deplored, that the users of these objects do not take the time or do not make the effort to send back these objects to the operator responsible for their recycling or their destruction.

There is therefore a need to incite the users of the objects to be reshipped to reship them.

At the same time, connected packages have recently appeared. These packages are equipped with an electronic display device visible from the exterior of the package and intended to display a shipping postal address and possibly several other types of information.

The display devices of these packages can be programmed to allow the user of the package to activate a reshipment of the package to a predetermined drop-off location, the drop-off address then being displayed on the electronic display device.

In addition, given their cost, these "connected" packages are made of materials that are resistant to the different manipulations (opening, closing, shaping, etc.) and to the different shocks likely to occur during their transport phase. In this way, these packages are designed to be reused many, many times.

Currently, such packages are not used in a context of incentive for the reshipment of the object such as those mentioned above.

The objective of the invention is in particular to overcome the drawbacks or shortcomings of the prior art.

More specifically, the objective of the invention is to propose a system for routing objects using reusable connected packages which facilitate the reshipment of used objects to a recycling or destruction facility.

The objective of the invention is also to provide such an object routing system that preserves the integrity of the package, including with transported objects that are aggressive or messy for the package.

Another objective of the invention is to provide such a system which is easy to use for the users.

These objectives, as well as others which will appear later, are achieved thanks to the invention which relates to a system for routing an object, implementing:
 a plurality of primary packages each having an electronic display device accessible from the exterior of the package, and including a computing unit parameterized to transmit display instructions to the electronic display device,
 a computing platform comprising a database relating to the objects, matching, for each object, an identifier and a label to be displayed on the electronic display device, the computing platform being connected to first long-distance communication means, the primary packages being connected to second long-distance communication means able to communicate with the first long-distance communication means,
characterized in that it comprises:
 at least one RFID ticket to be coupled, directly or indirectly, to the object and containing the identifier of the object,
 a proximity transceiver integrated into each primary package, able to communicate with the RFID ticket and being parameterized to read the identifier,
and in that the computing unit is connected to the transceiver and is further parameterized to transmit the identifier to the computing platform via the first and second long-distance communication means, the computing platform being parameterized to return to the computing unit the label corresponding to the identifier and the computing unit being parameterized to transmit to the electronic display device a label display instruction.

Thus, thanks to the invention, the primary package is programmed, via the RFID ticket coupled to the object to be shipped (or reshipped), with the label corresponding to the identifier of the object.

Its is noted that the identifier of the object is unique, certified and encrypted.

It is also noted that, within the meaning of the invention, a "label" can be defined as a digital ticket integrating the address of the recipient, the address of the sender and tracking logistics tags. As such, once displayed by the electronic display device of the primary package, the label is similar to a ticket affixed to the primary package and bearing various information. For content security reasons, no mention of said content is made on the label.

In addition, a routing system according to the invention may turn out to have incentive dimension for the reshipment of objects to be recycled or destroyed. Indeed, an object of this type can be delivered with a dedicated RFID ticket, programmed with an identifier, the latter being itself recorded in the database of the computing platform to associate thereto a label to be displayed on the electronic display device of the primary package. All the consumer has to do is place the consumed object in the appropriate primary package so that the latter, via its embedded intelligence, automatically displays the reshipment address corresponding to the object placed in the primary package.

According to a first advantageous solution, the proximity transceiver is an RFID reader, and more specifically a UHF RFID reader.

According to a second advantageous solution, the proximity transceiver is an NFC reader.

In either case, this type of proximity transceiver is very common and can therefore be implemented inexpensively and in large series.

According to one advantageous solution, the database is parameterized such that the label comprises data relating to a physical destination address.

As indicated previously, this allows automatic display of the physical destination address on the primary package. This being the case, the label can comprise data other than the destination address without departing from the scope of the invention.

Thus, according to another advantageous solution, the database is parameterized such that the label comprises data relating to the weight of the object.

In this way, using a weight measurement device integrated into the primary package, it is possible to calculate the billing for the delivery to take into account the mass of the content. In other words, the primary package transmits the unique identifier of the content and its weight in an encrypted manner. In return, the computing platform sends a prepaid label with the right weight, indicating the physical address of the recipient capable of processing the content.

According to one particular embodiment, the system implements secondary packages, able to be contained in the primary packages, the RFID ticket being carried by the secondary packages.

It is understood that, in this embodiment, the RFID ticket is not carried directly by the object to be reshipped itself but by another package, called secondary package, in which the object is introduced, the whole being placed in the primary package.

Within the context of this embodiment, it is then possible to transport, in a reusable connected primary package, objects likely to be aggressive or messy for the primary package. Indeed, the aggressive and/or messy object is confined in the secondary package. As a result, the material integrity of the primary package is preserved, as well as its ability to be reused multiple times, without requiring upkeep or maintenance.

Indeed, the secondary package constitutes, vis-à-vis the primary package, a protective enclosure for the internal volume of the primary package.

According to this embodiment, the secondary packages comprise a container having a cavity and the closing means which can adopt, with the container, an open configuration or a closed configuration in which the closing means prohibit access to the cavity, the RFID ticket being integrated into a seal guaranteeing that the secondary package is held in its closed configuration.

In this way, the seal has a double function, namely:
it forms a medium bearing the identification data of the transported object;
it holds the container and the associated closing means in the closed configuration, prohibiting the replacement of the transported object with another (not corresponding to the identifier) or, at the very least, reports the reopening of the secondary package.

In this case, the seal advantageously comprises a part that is irreversibly degradable when the secondary package switches from the closed configuration to the open configuration.

Thus, it is not possible to impair the integrity of the seal without it being visible or, at the very least, without it being reported.

According to one particular embodiment, the seal takes the form of a strip intended to be glued in an overlapping manner on the container and the secondary package closing means in the closed configuration of the secondary packages.

Such a seal, for example a sticker, is very practical to use and can be implemented quickly on the secondary package.

Preferably, the seal comprises an electronic radiofrequency identification chip, and first communication means comprising an antenna, the first communication means being coupled to the electronic chip and extending at least partially into the degradable part of the seal, the transceiver of the primary package being configured to periodically send a radio request capable of being picked up by the antenna, then transmitted to the electronic chip, and to receive a return signal produced by the electronic chip in response to the radio request then transmitted by the antenna, the computing unit being parameterized to detect an absence of a return signal.

According to this embodiment, it is possible to know in real time if the seal guaranteeing that the secondary package is held in the closed configuration has been degraded. Such information therefore allows knowing whether the secondary package has been opened following the affixing of the seal. A consultation of the computing unit of the primary package allows getting information on a possible opening.

Indeed, an opening the secondary package and in other words a switching from its closed configuration to its open configuration, leads to degradation (breakage) of the degradable part of the seal Thus, since the first communication means are integrated into the degradable part, then they are also degraded during the opening of the secondary package. This degradation of the first communication means then prevents the receipt and/or the transmission of the request emitted by a transceiver to the electronic radiofrequency identification chip and consequently the electronic chip does not produce a return signal.

Within this context, it is recalled that the information exchanged between the ticket, the primary package and the remote computing platform is encrypted and certified.

Other characteristics and advantages of the invention will appear more clearly upon reading the following description of a preferred embodiment of the invention, given by way of illustrative and non-limiting example, with reference to the single FIG. 1 which provides a schematic illustration of a routing system according to the invention.

As illustrated in FIG. 1, a system for routing an object according to the invention implements a plurality of primary packages 1, of the type consisting of:
a box 10 delimiting a receiving volume intended to accommodate one or several object(s);
a lid 1 connected or not to the box 10, and which can adopt, with the box, a primary package closed configuration or a primary package open configuration.

The primary packages each have, furthermore:
an electronic display device 12 accessible from the exterior of the primary package;
a computing unit 13 parameterized to transmit display instructions to the electronic display device.

The routing system according to the invention further comprises a computing platform 2 including a database 20 relating to the objects to be routed, this database matching, for each object, an identifier and a label to be displayed on the electronic display device of the primary packages.

In addition, the computing platform is connected to first long-distance communication means 21.

The primary packages for their part are connected to second long-distance communication means 14 able to communicate with the first long-distance communication means of the computing platform.

According to the principle of the invention, the routing system comprises, for each primary package:
- an RFID ticket 15 (or even several) coupled directly or indirectly to the object to be routed, this RFID ticket being programmed so as to contain the identifier of the object to be routed as stored in the database 20 of the computing platform;
- a proximity transceiver 16 integrated into each primary package and able to communicate with the RFID ticket 15 of the same primary package, the transceiver being parameterized to read the identifier contained in the RFID ticket.

In addition, the computing unit of the primary package is connected to the corresponding transceiver 15 and is further parameterized to transmit the identifier of the contained object to the computing platform 2 via the first long-distance communication means and the second long-distance communication means. The computing platform 2 is further parameterized to return to the computing unit 13, again via the first long-distance communication means and the second long-distance communication means, the label corresponding to the identifier of the object contained in the primary package (the label in question having been matched with the identifier of the object via the database 20 of the computing platform 2). Note that the identifier contained in the ticket affixed to the package is unique and certified and that the exchanges between the unit of the primary package and the platform are preferentially encrypted.

At the level of the primary package, the computing unit is parameterized to ultimately transmit to the electronic display device 12 of the primary package a label display instruction.

The label preferably comprising data relating to a physical destination address of the object to be routed, the destination address is then displayed on the electronic display device 12 of the primary package.

In this sense, the database 20 of the computing platform is parameterized such that the label, for each object to be routed, comprises said physical destination address data for the object in question.

Note that the database of the computing platform can also be parameterized such that the label comprises data relating to the weight of the object.

As regards the proximity transceiver integrated into the primary package, the latter can be of the RFID or NFC type.

According to the embodiment illustrated in FIG. 1, the routing system implements, in addition to the primary packages, secondary packages 3, able to be contained in the primary packages (that is to say dimensioned so as to be housed in a primary package). In this case, the object(s) to be routed are disposed and contained inside the secondary package transported by the primary package. In addition, as it appears in FIG. 1, the RFID ticket 15 is carried by the corresponding secondary package.

According to this embodiment, the secondary packages 3 each comprise a container 30 having a cavity intended to receive the object(s) to be routed, as well as closing means 31 (in practice a lid) which can adopt, with the container, an open configuration giving access to the cavity of the secondary package or a closed configuration in which the closing means prohibit access to the cavity.

In this case, the RFID ticket 15 is then integrated into a seal 150 guaranteeing that the secondary package is held in its closed configuration.

According to one advantageous characteristic, the seal 150 comprises a degradable part 151 (schematically illustrated by the dotted line across the seal 150 and which may or may not consist of a pre-cut). This degradable part is irreversibly degradable when the secondary package switches from the closed configuration to the open configuration.

According to one preferred embodiment, the seal 150 takes the form of a strip, for example a self-adhesive strip, intended to be glued in an overlapping manner on the container 30 and secondary package closing means 31 in the closed configuration of the secondary packages.

Of course, the seal 150 is added in an overlapping manner on the container and the secondary package closing means once the object has been placed inside the secondary package and the latter brought back into the closed configuration.

Still according to this embodiment, the seal comprises an electronic radiofrequency identification chip 152 as well as first communication means in the form of an antenna 153, coupled to the electronic chip via a link extending at least partially into the degradable part of the seal.

The transceiver 16 of the primary package is for its part parameterized to periodically send a radio request capable of being picked up by the antenna of the seal, then transmitted to the electronic chip. The chip is programmed to produce a return signal intended to be received by the transceiver of the primary package in response to the radio request, this return signal being transmitted via the antenna. In addition, the computing unit is parameterized to detect an absence of a return signal.

In case of absence of a return signal, the computing unit 13 is also parameterized to emit an alert signal to the computing platform via the first long-distance communication means and the second long-distance communication means.

The operation of a routing system as described previously, with or without the implementation of secondary packages, is described below.

When an object is placed in the primary package by directly or indirectly carrying the RFID ticket 15, the identifier contained in the RFID ticket is transmitted to the proximity transceiver, in a manner known per se, the data relating to the identifier being transmitted to the computing unit of the primary package.

This identifier is transmitted, via the first long-distance communication means and the second long-distance communication means, to the computing platform.

Thanks to the database 20 relating to the objects, the identifier is matched with a label intended to be displayed on the display device of the primary package. The digital data relating to this label are emitted to the computing unit 13 of the primary package via the first long-distance communication means and the second long-distance communication means.

These data relating to the label are transmitted by the computing unit of the primary package to the electronic display device, with a display instruction.

Thus, if the label contains the data relating to a physical destination address, the latter is displayed on the electronic display device accessible from the exterior of the primary package.

With an object routing system according to the invention, it is possible to envisage an "inventory" mode use: at the operator's request or automatically at regular time intervals, the identifiers contained in the RFID tickets carried by the products themselves or by the secondary packages are read by the transceivers of the primary packages and are transmitted to the computing platform. During this operation, the opening of the primary packages is not necessary.

The invention claimed is:

1. A system for routing an object, implementing:
   a plurality of primary reusable intelligent packages each having a dedicated embedded electronic device including an electronic display device accessible from the exterior of the package, and including a dedicated embedded computing unit specifically tuned for automated reshipment scheduling and parameterized to transmit display instructions to the electronic display device,
   a computing platform comprising a database relating to the objects, directly matching, for each object, an identifier and a label to be displayed on the electronic display device, the computing platform being connected to first long-distance communication means, the primary packages being connected to second long-distance communication means able to communicate with the first long-distance communication means,
   at least one RFID ticket to be coupled, directly or indirectly, to the object and containing the identifier of the object, the identifier being certified and encrypted,
   a proximity NFC RFID or UHF RFID transceiver integrated into each primary package, configured to communicate exclusively with the RFID tickets located inside the receiving volume of the primary package and being parameterized to read the identifier, wherein
   the computing unit is connected to the transceiver and is further parameterized automatically, without user intervention, trigger a sequence comprising:
   detecting the presence of the RFID ticket and reading the identifier using the transceiver,
   securely transmitting the identifier by encryption to the computing platform via the first and second long-distance communication means,
   receiving from the computing platform the label corresponding to the identifier, and
   transmitting to the electronic display device a display instruction to automatically display return information on the label,
   the database being parameterized such that the label comprises data relating to a physical destination address of the object and the label being displayed on the electronic display device to show an address of routing of the primary package.

2. The system for routing an object according to claim 1, wherein it implements secondary packages, able to be contained in the primary packages, the RFID ticket being carried by the secondary packages.

3. The system for routing an object according to claim 2, wherein the secondary packages comprise a container having a cavity and closing means which can adopt, with the container, an open configuration or a closed configuration in which the closing means prohibit access to the cavity, the RFID ticket being integrated into a seal guaranteeing that the secondary package is held in its closed configuration.

4. The system for routing an object according to claim 3, wherein the seal comprises a part that is irreversibly degradable when the secondary package switches from the closed configuration to the open configuration.

5. The system for routing an object according to claim 3, wherein the seal takes the form of a strip intended to be glued in an overlapping manner on the container and the secondary package closing means in the closed configuration of the secondary packages.

6. The system for routing an object according to claim 4, wherein the seal comprises an electronic radiofrequency identification chip, and first communication means comprising an antenna, the first communication means being coupled to the electronic chip and extending at least partially into the degradable part of the seal, and in that the transceiver of the primary package is configured to periodically send a radio request capable of being picked up by the antenna, then transmitted to the electronic chip, and to receive a return signal produced by the electronic chip in response to the radio request then transmitted by the antenna, the computing unit being parameterized to detect an absence of a return signal.

7. The system for routing an object according to claim 5, wherein the seal comprises an electronic radiofrequency identification chip, and first communication means comprising an antenna, the first communication means being coupled to the electronic chip and extending at least partially into the degradable part of the seal, and in that the transceiver of the primary package is configured to periodically send a radio request capable of being picked up by the antenna, then transmitted to the electronic chip, and to receive a return signal produced by the electronic chip in response to the radio request then transmitted by the antenna, the computing unit being parameterized to detect an absence of a return signal.

* * * * *